(12) United States Patent
Yokohashi

(10) Patent No.: US 11,368,605 B2
(45) Date of Patent: Jun. 21, 2022

(54) INFORMATION PROCESSING DEVICE AND COMPUTER READABLE MEDIUM

(71) Applicant: FUJIFILM Business Innovation Corp., Tokyo (JP)

(72) Inventor: Mami Yokohashi, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/993,419

(22) Filed: Aug. 14, 2020

(65) Prior Publication Data
US 2021/0306527 A1  Sep. 30, 2021

(30) Foreign Application Priority Data

Mar. 24, 2020 (JP) .............................. JP2020-052154

(51) Int. Cl.
*H04N 1/60* (2006.01)

(52) U.S. Cl.
CPC ......... *H04N 1/6033* (2013.01); *H04N 1/6008* (2013.01); *H04N 1/6027* (2013.01)

(58) Field of Classification Search
CPC ... H04N 1/6033; H04N 1/6008; H04N 1/6027
USPC ....................................... 358/1.9, 1.15, 504
See application file for complete search history.

(56) References Cited

U.S. PATENT DOCUMENTS

| 2013/0135686 A1* | 5/2013 | Abe | H04N 1/6055 358/406 |
| 2014/0071497 A1* | 3/2014 | Kuno | H04N 1/6033 358/3.06 |
| 2017/0185875 A1* | 6/2017 | Shimura | H04N 1/6091 |

FOREIGN PATENT DOCUMENTS

JP        2010-164891        7/2010

OTHER PUBLICATIONS

English language machine translation of JP 2010-164891.

* cited by examiner

*Primary Examiner* — Quang N Vo
(74) *Attorney, Agent, or Firm* — Fildes & Outland, P.C.

(57) ABSTRACT

An information processing device includes a memory and a processor configured to instruct an image output unit to output a colorimetric pattern including plural test images, the image output unit being configured to output, onto a recording medium, an image based on image data processed by an image processing unit, and notify, based on a difference between a measured value obtained by measuring a color of each test image in the colorimetric pattern output by the image output unit and a target value determined according to characteristics of the recording medium used for outputting the image, whether resetting is to be performed in relation to the image processing unit or be performed in relation to the image output unit.

17 Claims, 13 Drawing Sheets

FIG. 2

EXAMPLE OF PRINTING CONDITION MANAGEMENT TABLE

| PAPER NAME | BASIS WEIGHT (g/m²) | SMOOTHNESS (sec) | TRANSFER VOLTAGE ADJUSTMENT VALUE (%) | FIXING TEMPERATURE (°C) |
|---|---|---|---|---|
| PAPER A | 64 | 100 | 0 | 160 |
| PAPER B | 80 | 290 | 5 | 170 |
| PAPER C | 120 | 410 | 8 | 165 |
| PAPER D | 75 | 1000 | 12 | 180 |

FIG. 3

EXAMPLE OF PAPER DATABASE

| PAPER NAME | BASIS WEIGHT (g/m²) | SMOOTHNESS (sec) | K DENSITY | C DENSITY | M DENSITY | Y DENSITY |
|---|---|---|---|---|---|---|
| PAPER A | 64 | 100 | 1.5 | 1.3 | 1.2 | 1.4 |
| PAPER B | 80 | 290 | 1.6 | 1.3 | 1.1 | 1.4 |
| PAPER C | 120 | 410 | 1.7 | 1.5 | 1.3 | 1.4 |
| PAPER D | 75 | 1000 | 1.8 | 1.6 | 1.1 | 1.6 |

FIG. 10

EXAMPLE OF REFERENCE VALUE OF SINGLE-COLOR DENSITY BASED ON PAPER TYPE

| PAPER TYPE | K DENSITY | C DENSITY | M DENSITY | Y DENSITY |
|---|---|---|---|---|
| PLAIN PAPER | 1.5 | 1.3 | 1.2 | 1.4 |
| HIGH-QUALITY PAPER | 1.6 | 1.3 | 1.1 | 1.4 |
| CARDBOARD | 1.7 | 1.5 | 1.3 | 1.4 |
| COATED PAPER | 1.8 | 1.6 | 1.1 | 1.6 |

INFORMATION PROCESSING DEVICE AND COMPUTER READABLE MEDIUM

CROSS-REFERENCE TO RELATED APPLICATIONS

This application is based on and claims priority under 35 USC 119 from Japanese Patent Application No. 2020-52154 filed on Mar. 24, 2020.

BACKGROUND

Technical Field

The present invention relates to an information processing device and a computer readable medium.

Related Art

JP-A-2010-164891 discloses an image formation device in which a single-color toner image is formed and transferred to paper with an area ratio of 100%; after the toner image is fixed by a fixing unit, a color of the toner image is measured; based on color space coordinates of the color and color space coordinates of a predetermined reproduction target color, an image formation condition is set such that a toner adhesion amount is optimal; under the image formation condition, the single-color toner image having the area ratio of 100% is formed and transferred by an image formation unit; after the toner image is fixed by the fixing unit, the color of the toner image is measured; a fixing condition is controlled based on the color space coordinates of the color and the color space coordinates of the predetermined reproduction target color.

SUMMARY

Aspects of non-limiting embodiments of the present disclosure relate to providing an information processing device and a computer readable medium storing a program in which, in a case where resetting is performed for bringing a color of an image output from an image output unit configured to output an image processed by an image processing unit configured to perform image processing on the image to be output and an image output unit configured to output the image processed by the image processing unit onto a recording medium close to a target value, a user is notified that resetting is performed whether in the image processing unit or in the image output unit may bring the color of the output image close to the target value with less effort.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a memory; and a processor configured to instruct an image output unit to output a colorimetric pattern including plural test images, the image output unit being configured to output, onto a recording medium, an image based on image data processed by an image processing unit, and notify, based on a difference between a measured value obtained by measuring a color of each test image in the colorimetric pattern output by the image output unit and a target value determined according to characteristics of the recording medium used for outputting the image, whether resetting is to be performed in relation to the image processing unit or be performed in relation to the image output unit.

BRIEF DESCRIPTION OF DRAWINGS

Exemplary embodiment(s) of the present invention will be described in detail based on the following figures, wherein:

FIG. 2 is a diagram showing an example of a printing condition management table used when printing condition parameters are set based on characteristic values of paper;

FIG. 3 is a diagram showing an example of a paper database stored in a paper information management server 70;

FIG. 10 is a diagram showing an example of a correspondence table in which a paper type is associated with a reference value of a single-color density;

DETAILED DESCRIPTION

Next, an exemplary embodiment of the present invention will be described in detail with reference to the drawings.

Figure 1:
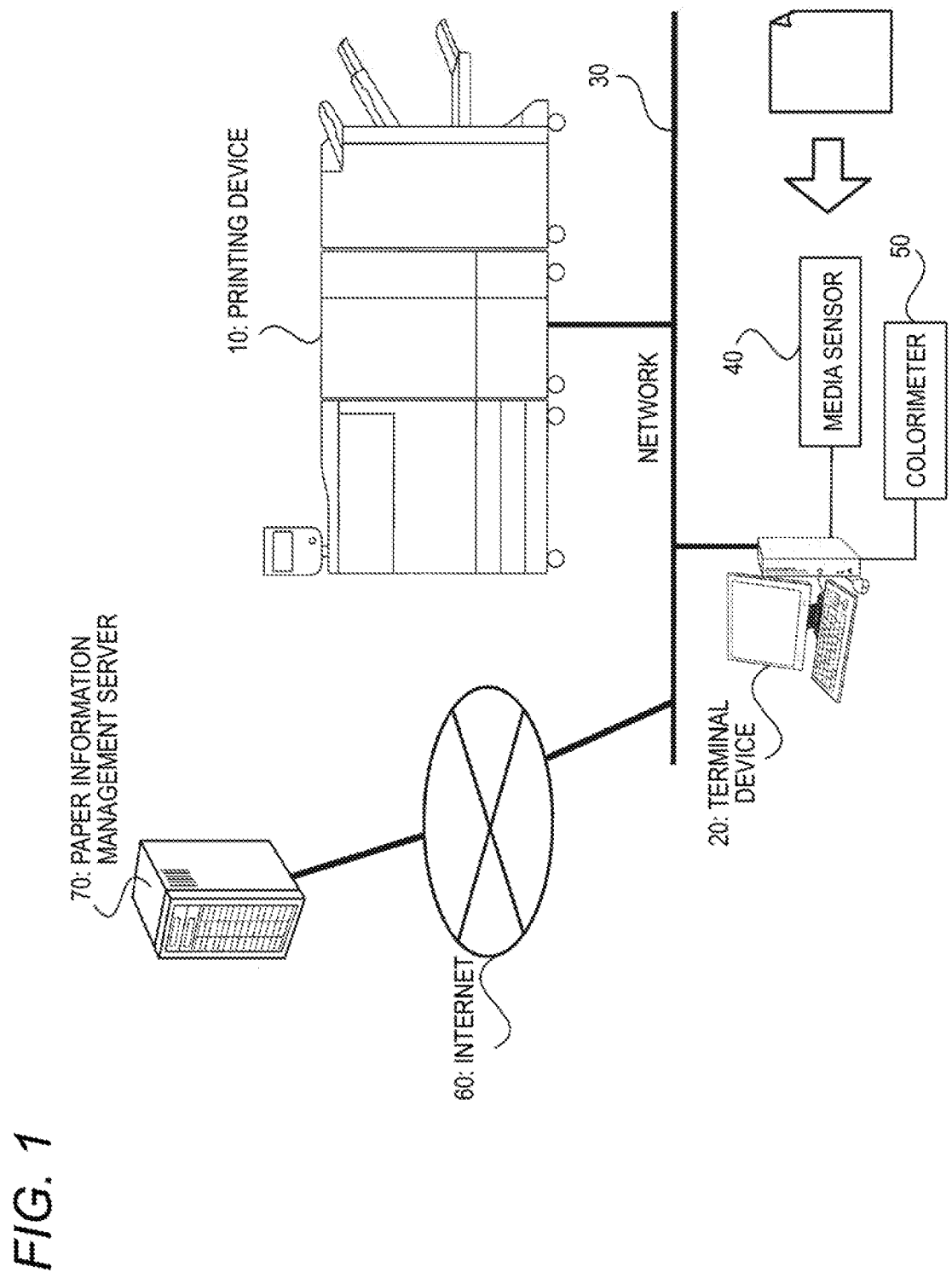
FIG. 1 is a diagram showing a system configuration of a printing system according to an exemplary embodiment of the present invention.

FIG. 1 is a diagram showing a system configuration of a printing system according to the exemplary embodiment of the present invention.

In the printing system according to the exemplary embodiment of the present invention, as shown in FIG. 1, a printing device 10 and a terminal device 20 are connected to each other by a network 30, and the terminal device 20 is connected to a paper information management server 70 via the Internet 60.

The terminal device 20 is a printing control device that generates printing data and transmits the generated printing data to the printing device 10 via the network 30 to execute printing processing. The terminal device 20 is an information processing device configured by installing a program for controlling the printing device 10 in a personal computer. The printing device 10 includes an image output unit that prints an image on a recording medium such as printing paper through processes such as charging, exposure, development, transfer and fixing. The printing device 10 receives the printing data transmitted from the terminal device 20, and outputs the image corresponding to the printing data on the paper.

A media sensor 40 that measures smoothness of the paper and a colorimeter 50 are connected to the terminal device 20.

Here, the smoothness is a characteristic value indicating degree of unevenness of a surface of the paper, that is, degree of flatness. A specific test method for the flatness is defined by a JIS standard, and time taken until a certain amount of air flows in by suctioning the surface of the paper and reducing a pressure is measured as the smoothness. Therefore, the smoothness is a value expressed in unit of seconds (sec). As the paper is flatter, the amount of the air flowing in is smaller, and a smoothness value is larger. That is, as the smoothness value is larger, the surface of the paper is smoother; and as the smoothness value is smaller, the surface of the paper is less smooth. For example, the paper such as coated paper has a large smoothness value.

As an index indicating the smoothness of the paper, not only a value obtained by an air type measurement method as described above but also an index obtained by emitting a light and measuring the reflected light to indicate the smoothness of the paper by intensity of the measured reflected light may be used.

The colorimeter 50 measures a color of a patch image in an evaluation chart printed by the printing device 10 and outputs the measured value a colorimetric value expressed in the Lab color space.

Here, a color of the image printed by the printing device 10 changes depending on characteristic values of the paper to be used. Here, the characteristic values of the paper includes not only the smoothness described above, but also various values such as a basis weight (g/m$^2$) serving as a weight per square meter, and a Lab value indicating whiteness of the paper. However, a case where the smoothness is used as a representative characteristic value of the paper will be described in the present exemplary embodiment.

Since the color of the image printed by the printing device 10 changes depending on the characteristic values of the paper to be used, printing condition parameters of the printing device 10 are set according to the characteristic values of the paper to be used when the printing processing is executed by the printing device 10.

Here, the printing condition parameters refer to mechanical output conditions in the printing device 10, for example, a transfer voltage condition for transferring a toner image formed on an intermediate belt serving as an intermediate transfer member to the paper serving as the recording medium, and a fixing temperature condition for fixing the toner image formed on the paper.

Although the printing condition parameters actually include various conditions other than the transfer voltage condition and the fixing temperature condition, a case where these two conditions are used as the printing condition parameters will be described in the present exemplary embodiment.

FIG. 2 shows an example of a printing condition management table used when the printing condition parameters are set based on the characteristic values of the paper as described above.

In the printing condition management table, the characteristic values of the paper such as the basis weight and the smoothness are associated with the printing condition parameters such as a transfer voltage adjustment value and a fixing temperature for each paper name of paper A to D with reference to FIG. 2. Here, the transfer voltage adjustment value is a percentage display of how much a voltage value is changed with respect to a certain reference transfer voltage.

Since such a printing condition management table is stored in the printing device 10, printing conditions corresponding to the characteristic values are automatically set by setting the characteristic values of the paper to be used for printing.

Specifically, the smoothness of the paper to be used for printing is measured by the media sensor 40, and the printing conditions are set by registering the smoothness of the paper in the printing device 10 from the terminal device 20. When the characteristic values of the paper to be used for printing are not registered in the printing condition management table, a new paper name is registered and the characteristic values of the paper are set, whereby the transfer voltage adjustment value and the fixing temperature suitable for the set characteristic values are automatically set.

Next, the paper information management server 70 will be described. The paper information management server 70 stores a paper database in which the characteristic values of the paper are associated with a target value of a single-color density of each CMYK color. An example of the paper database stored in the paper information management server 70 is shown in FIG. 3.

In the paper database, the characteristic values of the paper such as the basis weight and the smoothness are associated with the target value of the single-color density of each CMYK color for each paper name of paper A to D with reference to FIG. 3. The target value of the single-color density is a target value of a density obtained when single-color printing is performed at the maximum density.

How to use the paper database in the terminal device 20 will be described below.

Figure 4:
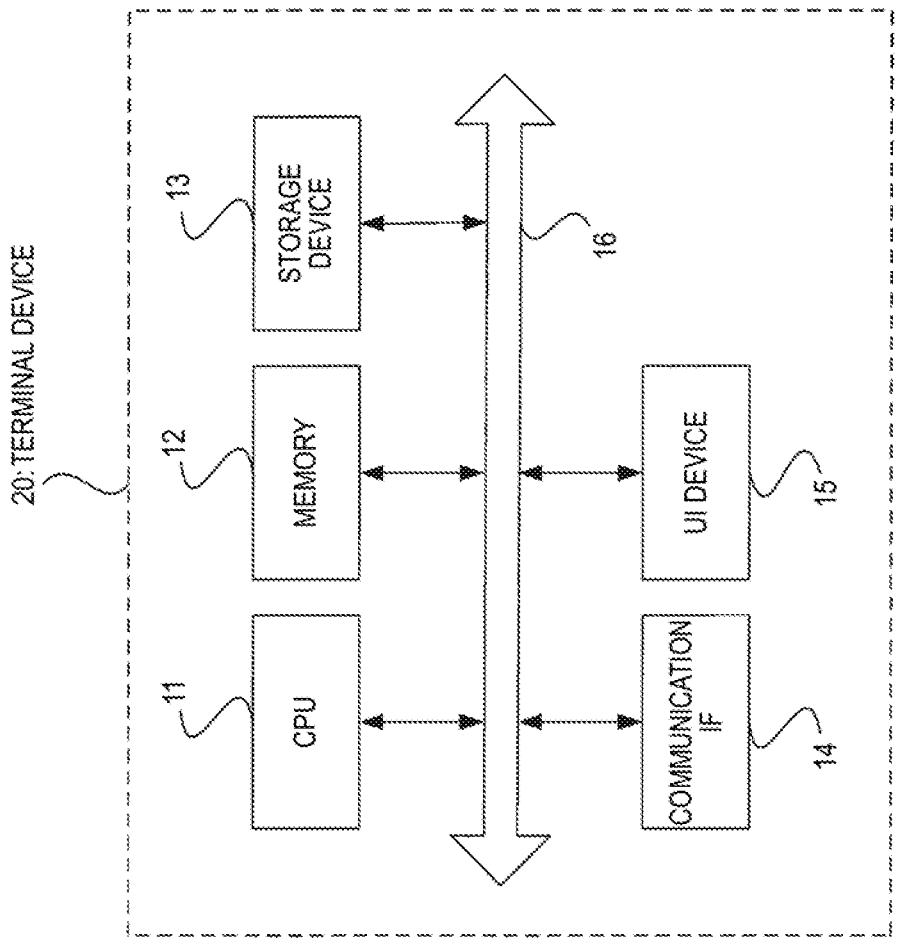
FIG. 4 is a diagram showing a hardware configuration of a terminal device 20 in the printing system according to the exemplary embodiment of the present invention.

Next, FIG. 4 shows a hardware configuration of the terminal device 20 in the printing system of the present exemplary embodiment.

As shown in FIG. 4, the terminal device 20 includes a CPU 11, a memory 12, a storage device 13 such as a hard disk drive, a communication interface (abbreviated as IF) 14 that transmits and receives data to and from an external device via the network 30, a user interface (abbreviated as UI) device 15 including a touch panel or a liquid crystal display and a keyboard. These components are connected to each other via a control bus 16.

The CPU 11 is a processor that executes predetermined processing based on a control program stored in the memory 12 or the storage device 13 to control an operation of the terminal device 20. Although the CPU 11 reads and executes the control program stored in the memory 12 or the storage device 13 in the present exemplary embodiment, the program may also be stored in a storage medium such as a CD-ROM and provided to the CPU 11.

Figure 5:
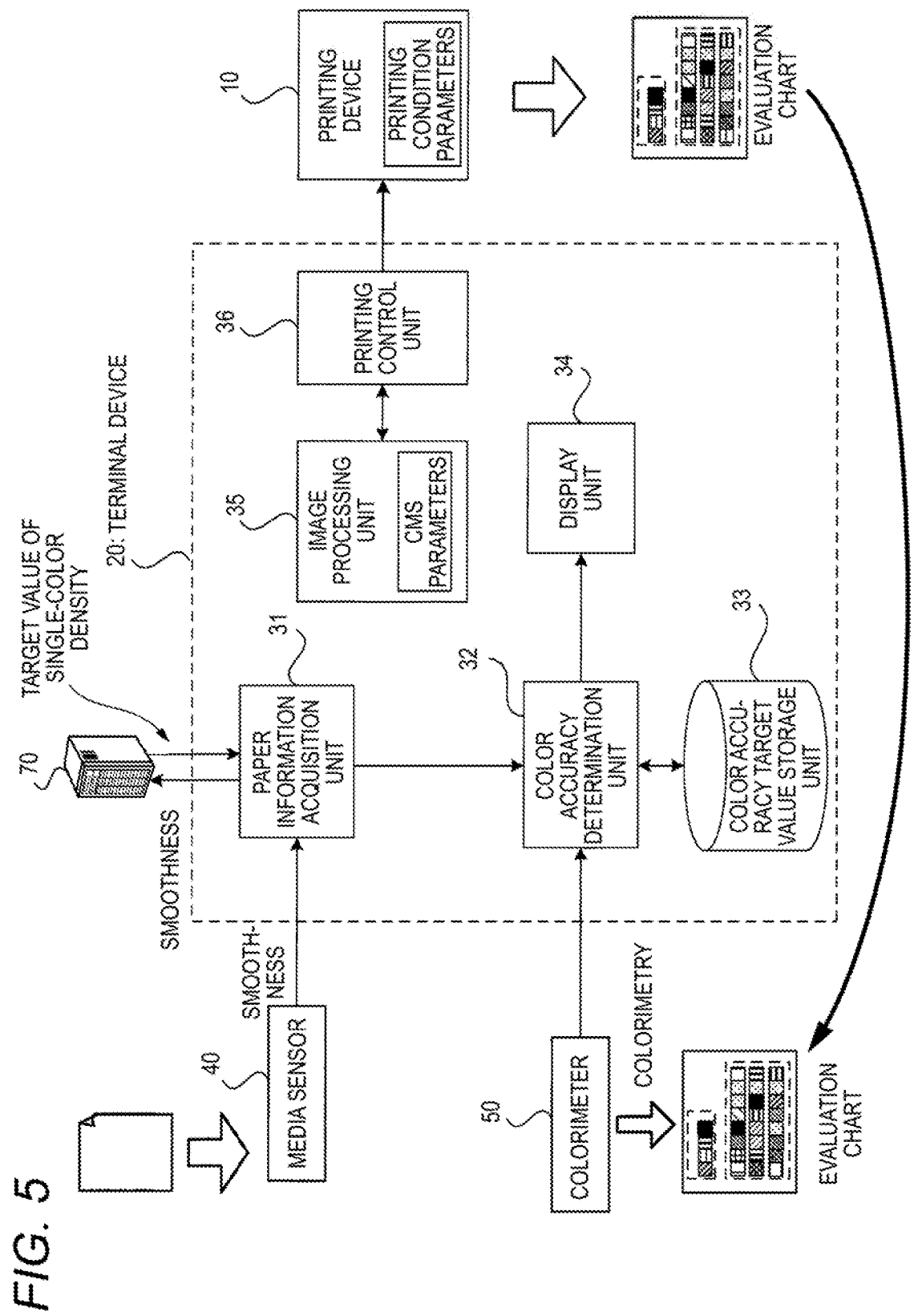
FIG. 5 is a diagram showing a functional configuration of the terminal device 20 in the printing system according to the exemplary embodiment of the present invention.

FIG. 5 is a block diagram showing a functional configuration of the terminal device 20 implemented by executing the control program.

As shown in FIG. 5, the terminal device 20 of the present exemplary embodiment includes a paper information acquisition unit 31, a color accuracy determination unit 32, a color accuracy target value storage unit 33, the display unit 34, an image processing unit 35 and a printing control unit 36.

The image processing unit 35 performs various types of image processing such as color conversion and gradation correction on the image to be output by using preset color management system (CMS) parameters. Here, the CMS parameters refer to, for example, a color conversion profile such as a four-dimensional look up table (LUT) that performs color conversion to convert image data in a CMYK space into another CMYK space.

The printing control unit 36 controls an operation of the printing device 10 by issuing a printing instruction to the printing device 10 such that the image processed by the image processing unit 35 is output on the paper serving as the recording medium.

When determining color accuracy of the image output by the printing device 10, the printing control unit 36 instructs the printing device 10 to output the evaluation chart serving as a colorimetric pattern including plural patch images. Each of the plural patch images included in the evaluation chart is a test image that is printed in a preset color and is used to confirm that a color value of the printed color does not deviate from a target value.

The paper information acquisition unit 31 transmits information on the characteristic value of the paper detected by the media sensor 40, for example, the smoothness to the paper information management server 70, and acquires, from the paper information management server 70, for each CMYK color, the target value of the density to be obtained when the image having the single-color maximum density is printed on the paper having the characteristic value.

For example, in a case where the paper database as shown in FIG. 3 is registered in the paper information management server 70, target values of single-color densities such as a K (black) density of 1.7, a C (cyan) density of 1.5, an M (magenta) density of 1.3 and a Y (yellow) density of 1.4 are acquired in response to information of 410 (sec) as the smoothness value to the paper information management server 70 transmitted by the paper information acquisition unit 31.

Here, a single color is a color represented by using only one type of toner. Multiple colors described below are colors represented by combining at least two or more types of toners.

The color accuracy target value storage unit 33 stores data of the target value of the color of each patch image included in the evaluation chart.

The color accuracy determination unit 32 calculates a color difference between the colorimetric value of each patch image in the evaluation chart measured by the colorimeter 50 and the target value of each patch image stored in the color accuracy target value storage unit 33, and performs color accuracy determination to determine whether there is a problem with the color of the image printed by the printing device 10. Here, when the calculated color difference is within a preset first threshold value, it is determined that there is no problem with the color accuracy; and when the calculated color difference is equal to or larger than the first threshold value, that is, when the colorimetric value and the target value are far apart, it is determined that there is a problem with the color accuracy.

A determination result of the color accuracy determination performed by the color accuracy determination unit 32 is notified to a user via the display unit 34.

In the color accuracy determination performed by the color accuracy determination unit 32 in this manner, when an average color difference serving as an average value of calculated color differences is within the first threshold value, the user is notified that there is no problem with the color accuracy.

Generally, when the printing device 10 is installed at a certain place and the printing processing is started, such color accuracy determination is performed, and the printing processing is started in a state where there is no problem with the color accuracy. However, the characteristic values of the paper may change due to a variation between lots of the paper to be used, an environment of the place where the printing device 10 is used, or the like, and the printing condition parameters may not be optimal due to aging of the printing device 10. Therefore, the color accuracy determination as described above is performed regularly or when there is a problem with a tint of a printing result.

However, when it is determined that there is a problem with the color accuracy in the color accuracy determination, readjustment for either the CMS parameters set in the image processing unit 35 or for the printing condition parameters set in the printing device 10 by the user may be necessary in order to address the problem with the color accuracy.

Here, when a range that is adjustable by resetting the CMS parameters is not so wide, and the printing condition parameters such as the fixing temperature and the transfer voltage are not optimal, the color accuracy may not be brought close to the target value. When trying to enable the color accuracy to reach the target value only by the CMS parameters, even if work such as printing the evaluation chart and colorimetry of the printed evaluation chart is repeated many times, the color accuracy cannot eventually reach the target value.

When trying to bring the color accuracy close to the target value by resetting the printing condition parameters, printing characteristics of the printing device 10 are also changed, resulting in a larger trouble such as a need to reset the CMS parameters. Therefore, in a case where it is the CMS parameters that are to be adjusted, resetting the printing condition parameters as well takes too much time and effort to bring the target value close to the color accuracy.

In a case where there is a problem with the color accuracy, it is difficult for a general user to determine whether to adjust the CMS parameters or the printing condition parameters.

Therefore, in the terminal device 20 of the present exemplary embodiment, when the color of the image output from the printing device 10 is reset close to the target value by performing the following processing by the color accuracy determination unit 32, the user is notified that resetting either the CMS parameters or the printing condition parameters may bring the color of the output image close to the target value with less effort.

Specifically, when determining that there is a problem with the color accuracy, the color accuracy determination unit 32 notifies, based on a difference between a measured value of the color of each patch image in the output evaluation chart measured by the colorimeter 50 and a target value determined according to characteristics of the paper to be used for outputting the image, the user via the display unit 34 whether resetting should be performed in the image processing unit 35 or be performed in the image output unit of the printing device 10.

More specifically, in a case where a difference between a density value of the patch image with the single-color maximum density of each CMYK in the plural patch images included in the evaluation chart and the target value determined according to the characteristics of the paper is equal to or larger than a threshold, the color accuracy determination unit 32 notifies the user that the resetting should be performed in the image output unit of the printing device 10.

Even when the difference between the density value of the patch image having the single-color maximum density of each CMYK in the plural patch images included in the evaluation chart and the target value determined according to the characteristics of the paper is not equal to or larger than the threshold, in a case where a color difference between a colorimetric value of the patch image with multiple colors whose coverage serving as a toner amount used per unit area is equal to or larger than a predetermined value and a target value of the test image is equal to or larger than a preset value, the color accuracy determination unit 32 notifies the user that the resetting should be performed in the image output unit of the printing device 10.

Here, the toner amount refers to an amount of toner used per unit area on the recording medium, for example, a toner weight ($g/m^2$), but in the following description is expressed by a toner coverage (hereinafter simply referred to as the "coverage") serving as a value that shows a ratio of the toner amount of each color used for printing in % when the maximum value of an amount of each color toner used per unit area, for example, per pixel is 100%.

Even when the difference between the density value of the patch image having the single-color maximum density of each CMYK in the plural patch images included in the evaluation chart and the target value determined according to the characteristics of the paper is not equal to or larger than the threshold, in a case where the color difference between the colorimetric value of the test image with the multiple colors whose coverage serving as the toner amount used per unit area is equal to or larger than the predetermined value and the target value of the patch image is smaller than the preset value, the color accuracy determination unit 32 notifies the user that the CMS parameters of the image processing unit 35 should be reset.

Here, when notifying that the resetting should be performed in the image output unit of the printing device 10, the color accuracy determination unit 32 notifies the user that the machine output conditions in the image output unit, for example, the transfer voltage condition for transferring the toner image formed on the intermediate transfer member to the paper, and the fixing temperature condition for fixing the toner image formed on the paper, should be adjusted.

When notifying that the resetting should be performed in the image processing unit 35, the color accuracy determining unit 32 notifies the user that the CMS parameters serving as color conversion coefficients set in the image processing unit 35 should be adjusted.

Next, the operation of the terminal device 20 in the printing system of the present exemplary embodiment will be described in detail with reference to the drawings.

Figure 6:
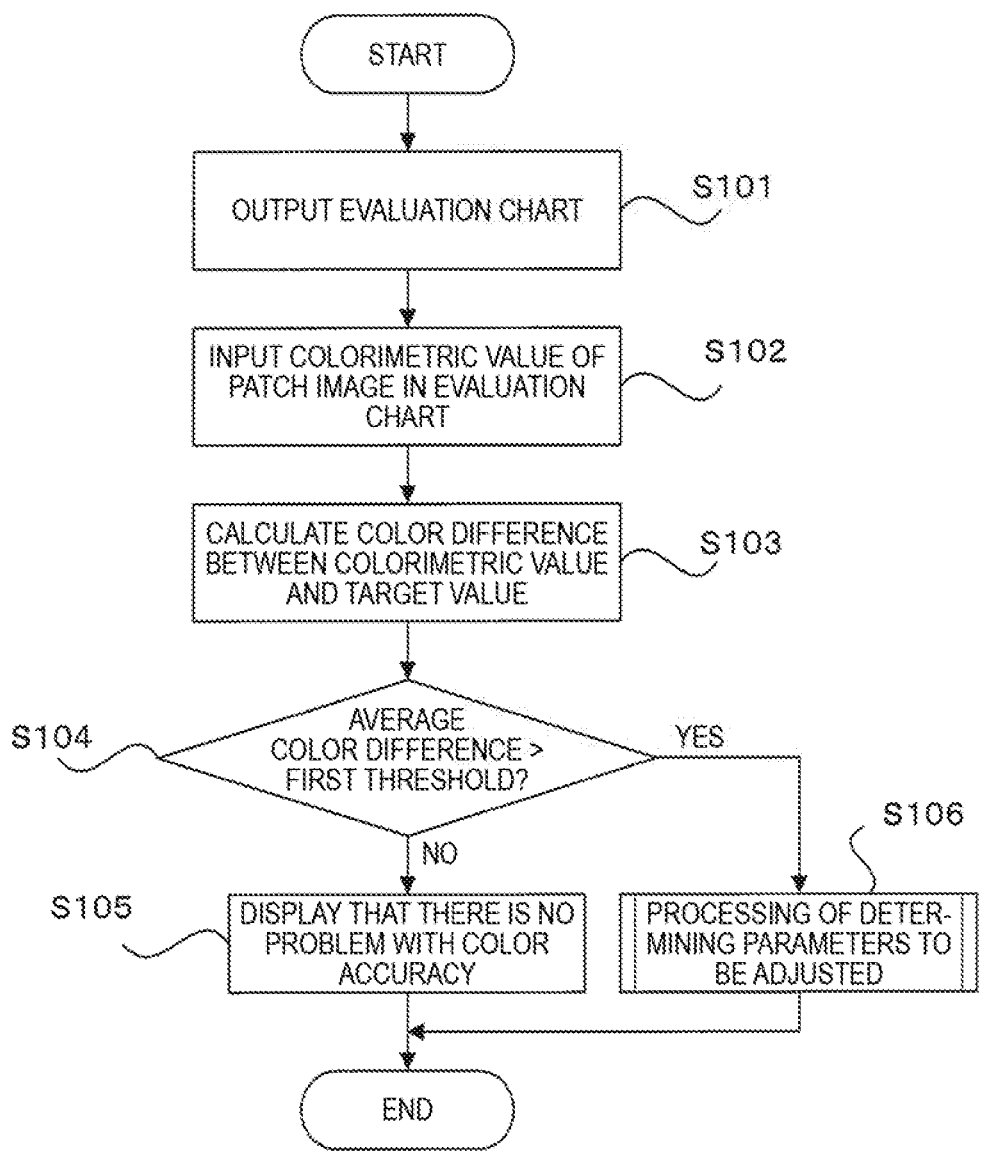
FIG. 6 is a flowchart for explaining color accuracy determination processing executed in the terminal device 20.

First, color accuracy determination processing executed in the terminal device 20 will be described with reference to a flowchart in FIG. 6.

First, when the color accuracy determination processing is performed, the printing control unit 36 causes the printing device 10 to output the evaluation chart serving as the colorimetric pattern for performing the color accuracy determination processing in step S101.

Figure 7:
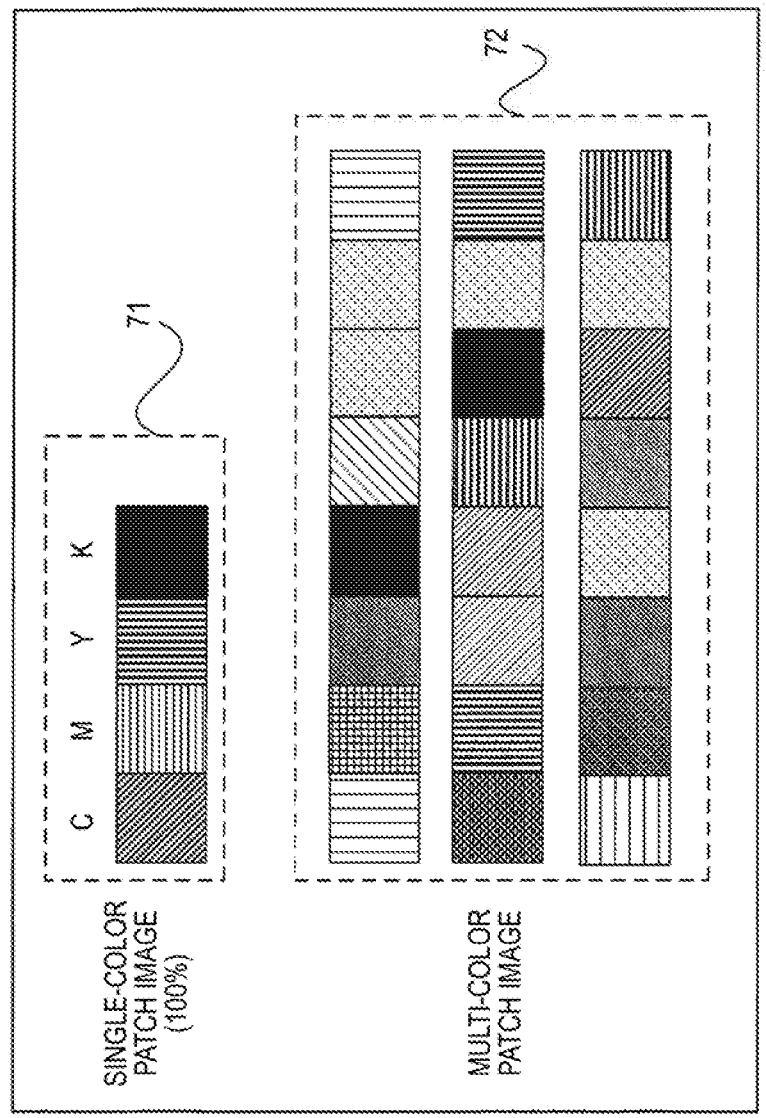
FIG. 7 is a diagram showing an example of an evaluation chart output from a printing device 10.

An example of the evaluation chart output from the printing device 10 in this manner is shown in FIG. 7. With reference to FIG. 7, the evaluation chart includes a single-color patch image 71 including patch images each having the maximum density of each CMYK color, that is, each having the coverage of 100%, and a multi-color patch image 72 including patch images in which least two colors of CMYK colors are combined together.

Here, the patch image of each color of the single-color patch image 71 is printed based on the image data that is not subjected to the color conversion performed by the color conversion profile in the image processing unit 35. Each patch image of the multi-color patch image 72 is printed based on the image data subjected to the color conversion performed by the color conversion profile in the image processing unit 35.

The present exemplary embodiment will describe a case where the evaluation chart used for the color accuracy determination processing, and the evaluation chart for determining whether to reset the CMS parameters or the printing condition parameters when it is determined that there is a problem with the color accuracy in the color accuracy determination processing, are the same. However, each evaluation chart may be separately configured.

In step S102, the color accuracy determination unit 32 inputs the colorimetric value obtained by measuring each patch image in such an evaluation chart by the colorimeter 50.

Then, in step S103, the color accuracy determination unit 32 calculates the color difference between the target value of each patch image stored in the color accuracy target value storage unit 33 and the colorimetric value of each input patch image.

In step S104, the color accuracy determination unit 32 determines whether the average color difference serving as the average value of the color differences obtained by calculation exceeds the preset first threshold value.

When the average color difference does not exceed the first threshold value, the color accuracy determination unit 32 displays on the display unit 34 that there is no problem with the color accuracy in step S105. An example of a screen displayed on the display unit 34 in this manner is shown in FIG. 8.

Figure 8:
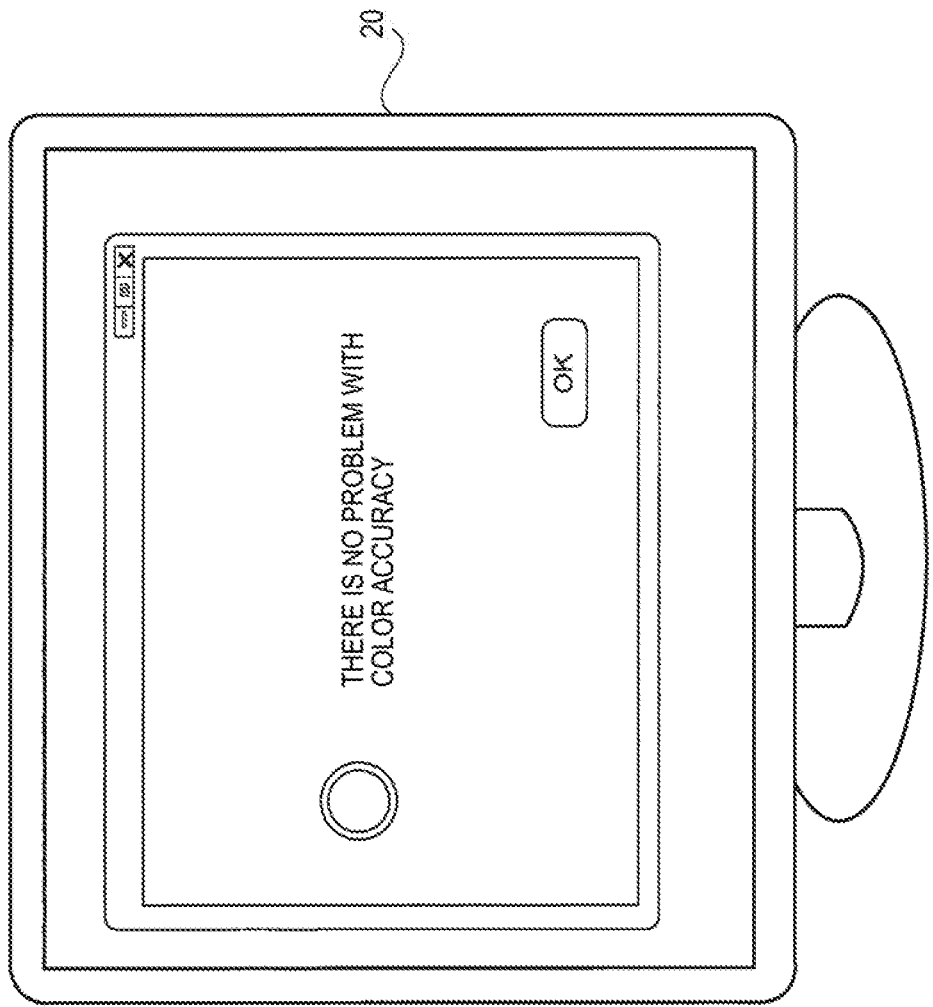
FIG. 8 is a diagram showing an example of a display screen when a display unit 34 displays that there is no problem with color accuracy.

With reference to FIG. 8, a text "There is no problem with color accuracy." is displayed on the screen, and the user is notified that the color accuracy of the image output from the printing device 10 in a current state meets a target.

In step S104, when the average color difference is equal to or larger than the first threshold value, the color accuracy determination unit 32 determines whether to adjust the CMS parameters or the printing condition parameters in step S106, and executes processing of notifying the user of a determination result.

Figure 9:
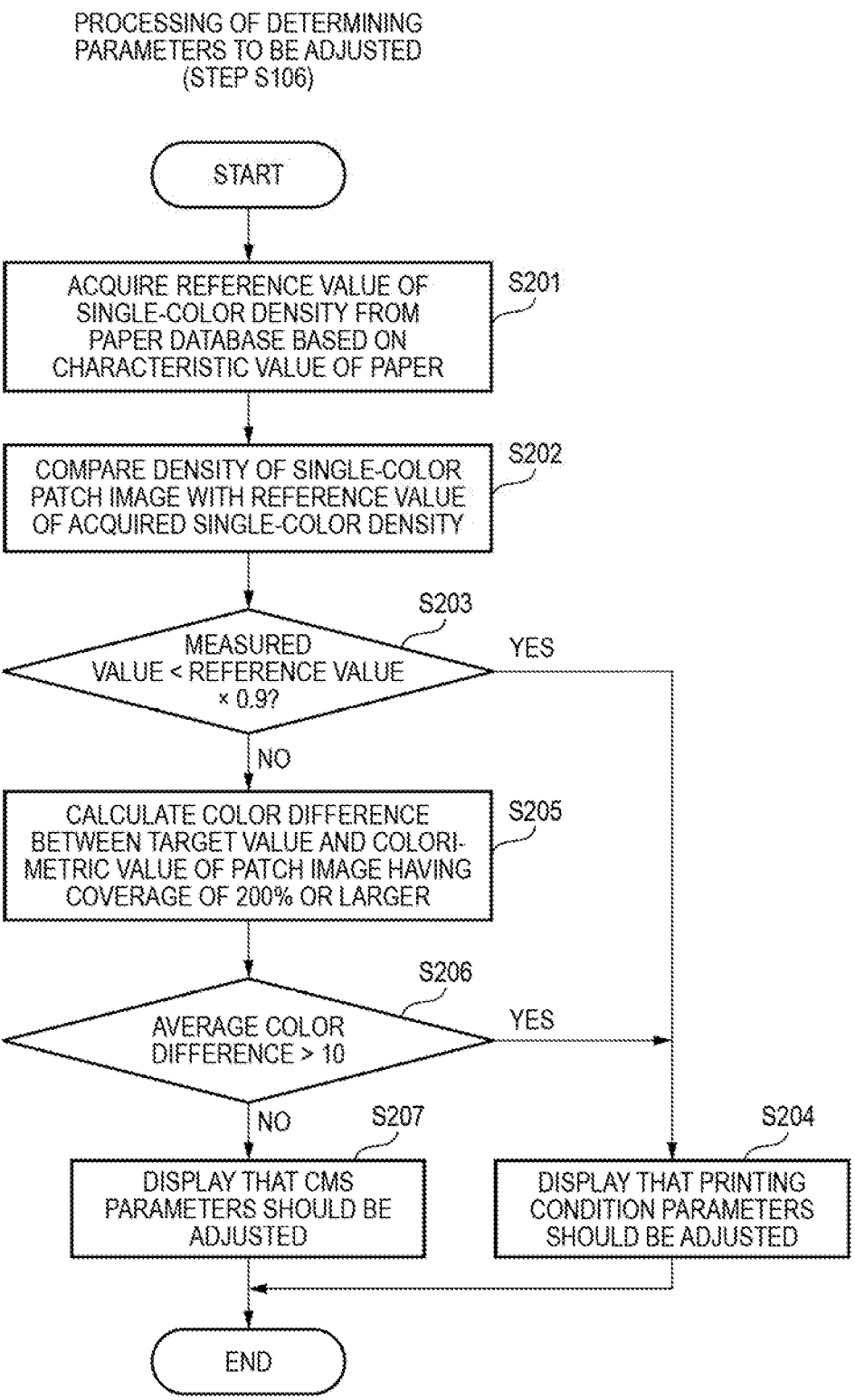
FIG. 9 is a flowchart for explaining details of processing of determining the parameters to be adjusted in step S106 of the flowchart in FIG. 6.

Details of processing of determining the parameters to be adjusted in step S106 will be described with reference to a flowchart in FIG. 9.

First, in step S201, the paper information acquisition unit 31 acquires a reference value of the single-color density from the paper database registered in the paper information management server 70 based on the smoothness serving as the characteristic value of the paper measured by the media sensor 40.

When the characteristic value such as the smoothness of the paper is not obtained, the paper information acquisition unit 31 may acquire the reference value of the single-color density based on a paper type. Specifically, in a case where a correspondence table as shown in FIG. 10 is prepared in advance, the paper information acquisition unit 31 acquires the reference value of the single-color density corresponding to the paper type to be used for the printing processing.

Next, in step S202, the color accuracy determination unit 32 compares the measured value of each density of the single-color patch image 71 in the colorimetric value measured by the colorimeter 50 with the reference value of the single-color density acquired by the paper information acquisition unit 31. In the present exemplary embodiment, a comparison between a value obtained by multiplying the reference value by 0.9 and the colorimetric value, not a simple comparison between magnitudes of the reference value and the colorimetric value, will be described.

When the measured value of each density of the single-color patch image 71 is smaller than the value obtained by multiplying the reference value by 0.9 in step S203, the color accuracy determination unit 32 displays on the display unit 34 that the printing condition parameters should be adjusted in step S204. An example of a screen displayed on the display unit 34 in this manner is shown in FIG. 11.

Figure 11:
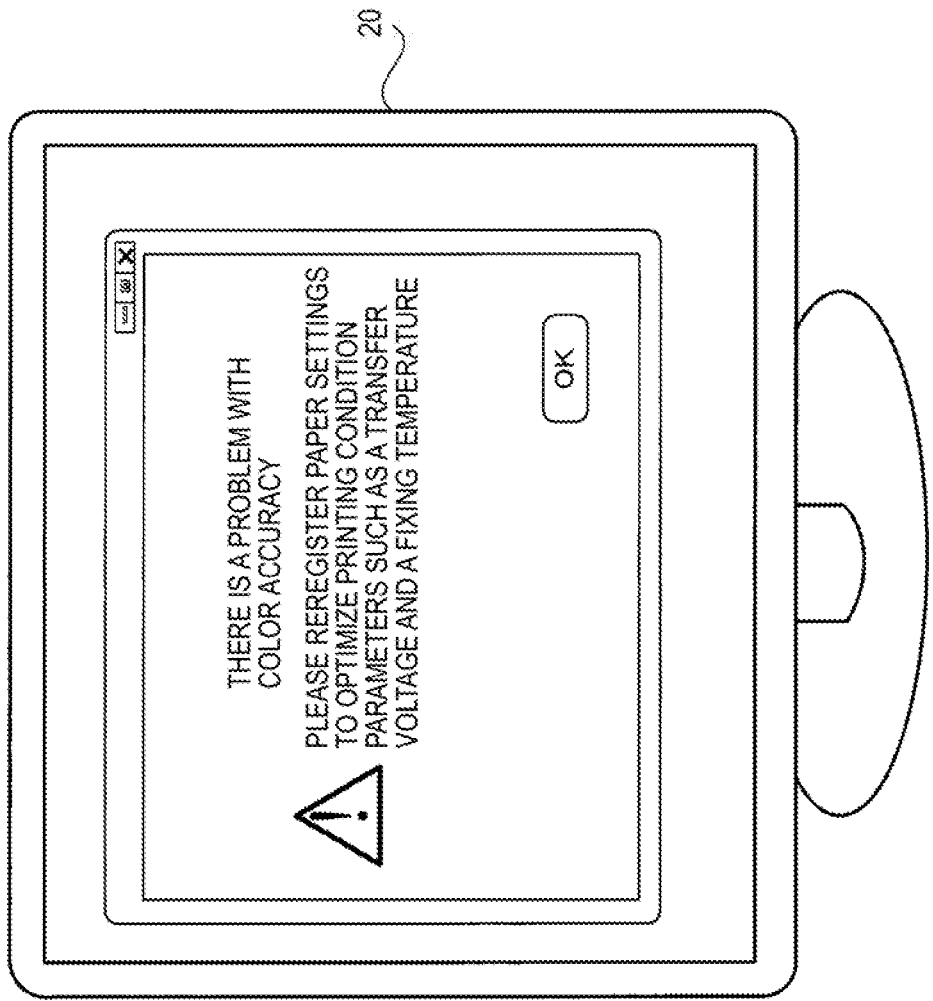
FIG. 11 is a diagram showing an example of a display screen when the display unit 34 displays that the printing condition parameters should be adjusted.

With reference to FIG. 11, a text "There is a problem with color accuracy. Please reregister paper settings to optimize printing condition parameters such as a transfer voltage and a fixing temperature." is displayed on the screen, and the user is notified that the printing condition parameters of the printing device 10 should be readjusted.

Here, reregistering the paper settings means that, in the printing condition management table as shown in FIG. 2, a new paper name is added, the characteristic values of the currently used paper are newly registered, and the transfer voltage adjustment value and the fixing temperature according to the characteristic values are set as the printing condition parameters.

When the measured value of each density of the single-color patch image 71 is equal to or larger than the value obtained by multiplying the reference value by 0.9 in step S203, the color accuracy determination unit 32 calculates the color difference between the target value and the colorimetric value of the patch image with the coverage of 200% or larger among the patch images of the multi-color patch image 72 in step S205.

In step S206, the color accuracy determination unit 32 determines whether the average color difference serving as the average value of the calculated color differences is larger than the second threshold value, for example, 10.

In step S206, when the average color difference is larger than 10, the color accuracy determination unit 32 displays on the display unit 34 that the printing condition parameters should be adjusted in step S204.

In step S206, when the average color difference is equal to or smaller than 10, the color accuracy determination unit 32 displays on the display unit 34 that the CMS parameters should be adjusted in step S207. An example of a screen displayed on the display unit 34 in this manner is shown in FIG. 12.

Figure 12:
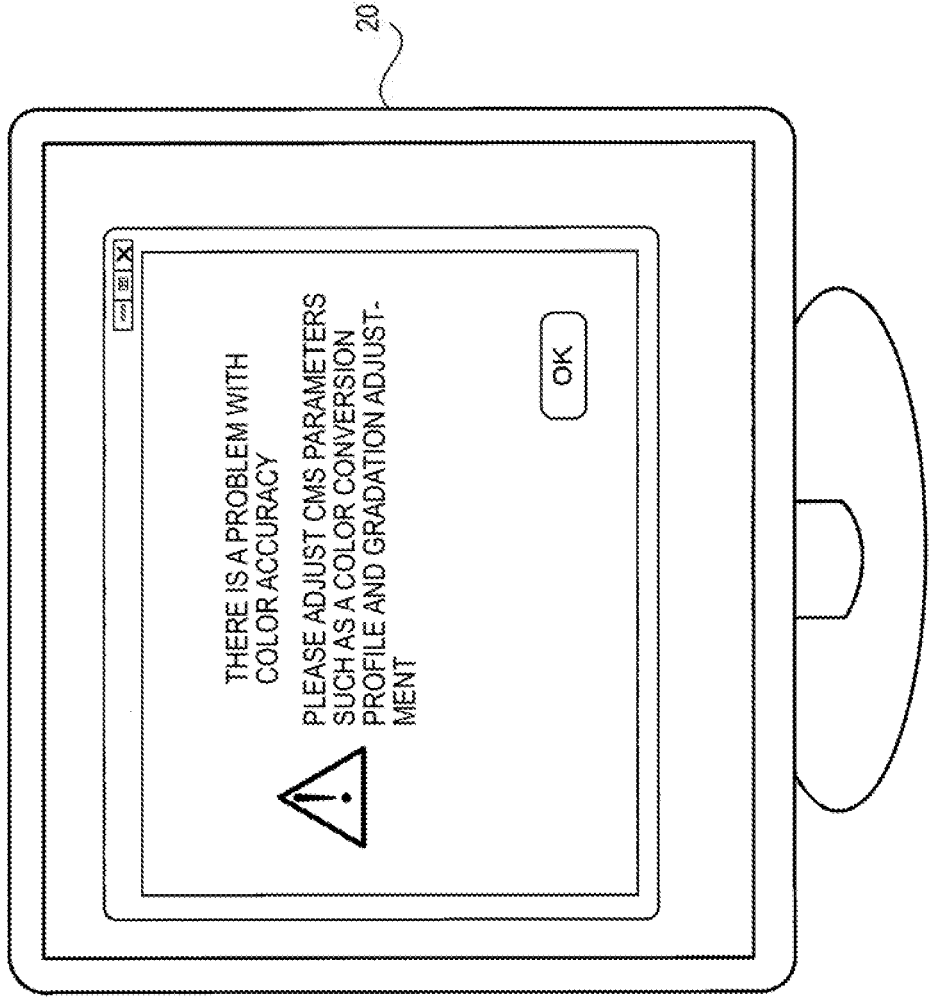
FIG. 12 is a diagram showing an example of a display screen when the display unit 34 displays that CMS parameters should be adjusted.

With reference to FIG. 12, a text "There is a problem with color accuracy. Please adjust CMS parameters such as a color conversion profile and gradation adjustment." is displayed on the screen, and the user is notified that the CMS parameters should be readjusted.

Next, a reason why it is possible to determine which of the printing condition parameters and the CMS parameters should be adjusted by the processing shown in FIG. 9 will be described below.

First, when the printing condition parameters are not appropriate for the characteristic values of the paper to be used, the maximum density that may be output is low. Therefore, even when there is a problem with the color accuracy, the color accuracy may not reach the target no matter how much the CMS parameters are adjusted.

Therefore, first, the color accuracy determination unit 32 determines whether the printing condition parameters are appropriately set for the paper by determining whether the density of the patch image having the single-color maximum density is equal to or larger than the target value according to the paper, in other words, by determining whether the density is equal to or larger than 90% of the reference value corresponding to the paper.

In this determination processing, when the density of the patch image having the single-color maximum density is smaller than 90% of the target value, the color accuracy determination unit 32 first notifies the user that the printing condition parameters should be adjusted.

Even if there is no problem with the color accuracy when the single-color maximum density, that is, the coverage is 100%, there may be a problem with the color accuracy of multiple colors when the coverage is larger than 100%. That is, when the coverage of each CMYK is 100%, the coverage of the image is 400%, so that a toner image may not be appropriately transferred or fixed.

Therefore, the color accuracy determination unit 32 selects the patch image with the coverage of 200% or larger out of the multi-color patch image 72, calculates the color difference between the colorimetric value and the target value of the selected patch image, and obtains the average color difference.

Here, a reason why the color accuracy determination unit 32 selects only the patch image with the coverage of 200% or larger out of the multi-color patch image 72 will be described with reference to FIG. 13.

Figure 13:
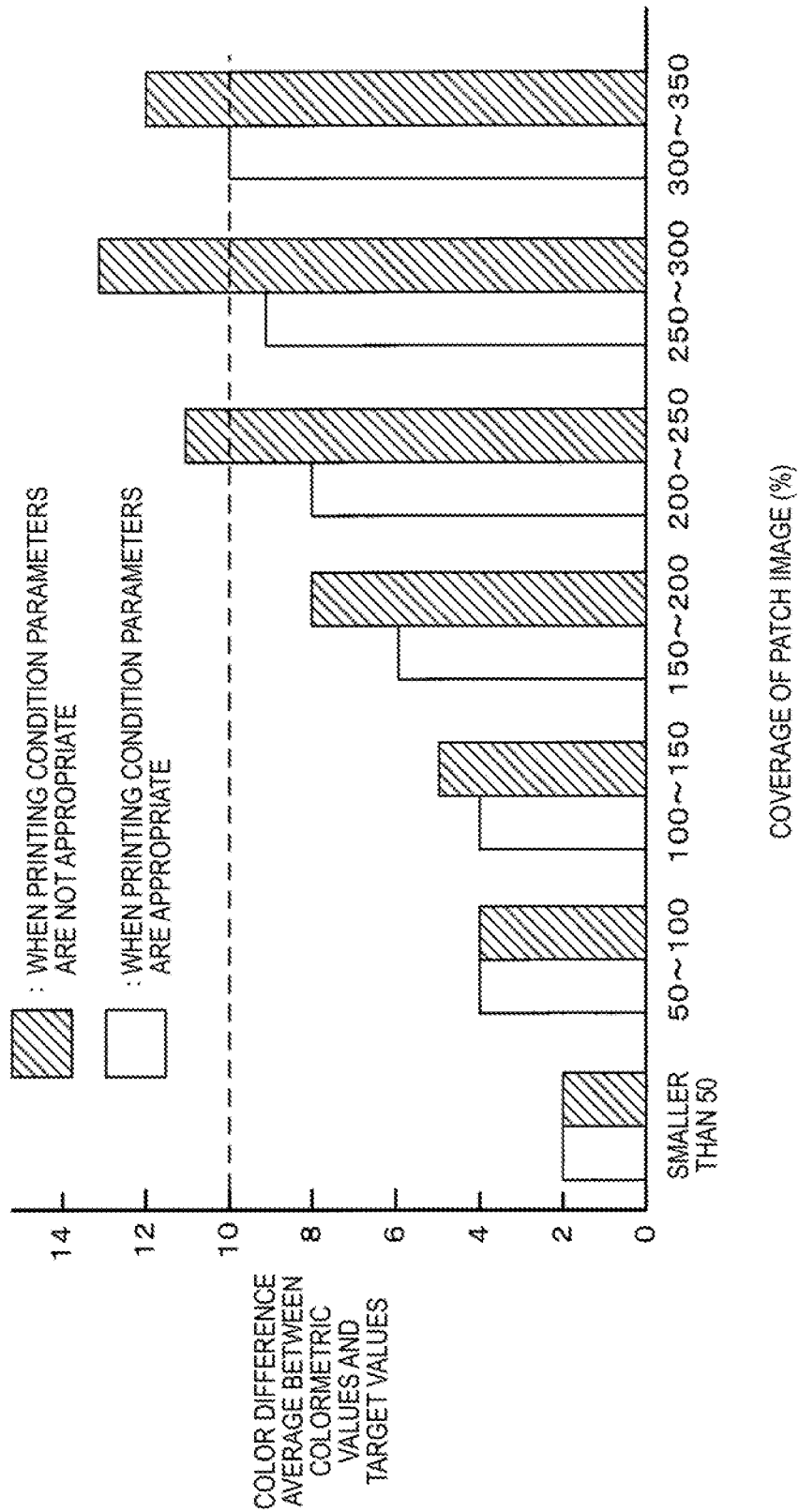
FIG. 13 is a diagram showing color difference averages between colorimetric values and target values of patch images having various coverages when the printing condition parameters are appropriate and when the printing condition parameters are not appropriate.

With reference to FIG. 13, a graph shows color difference averages between colorimetric values and target values of the patch images having various coverages when the printing condition parameters are appropriate and when the printing condition parameters are not appropriate.

Here, up to the coverage of the patch image of about 150%, there is no large difference in the color difference average between when the printing condition parameters are appropriate and when the printing condition parameters are not appropriate, but the difference in the color difference average increases as the coverage increases. In particular, the difference increases when the coverage is 200% or larger.

In the graph shown in FIG. 13, when the coverage is 200% or larger, the color difference average when the printing condition parameters are not appropriate is 10 or larger.

That is, when the coverage is about 100%, there may be no problem with the transfer or fixing of the toner, and when the coverage is 200% or larger, there may be a problem with the transfer or fixing of the toner due to a fact that the printing condition parameters are not appropriate.

Therefore, when the average color difference serving as the average value of the difference between the target value and the colorimetric value of the patch image having the coverage of 200% or larger is larger than 10, the color accuracy determination unit 32 notifies the user that the printing condition parameters should be adjusted.

When determining that the printing condition parameters are appropriately set by the above determination processing, the color accuracy determination unit 32 notifies the user that the color accuracy should be improved by adjusting the CMS parameters.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification

Although a case where the image processing unit 35 and the printing control unit 36 are provided in the terminal device 20 has been described in the above exemplary embodiment, the present invention is not limited thereto. The present invention may be similarly applied to an image formation device having a configuration in which the image processing unit 35 and the printing control unit 36 are provided in the printing device 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a memory, and
   a processor configured to
      instruct an image output unit to output a colorimetric pattern including a plurality of test images, the image output unit being configured to output, onto a recording medium, an image based on image data processed by an image processing unit, and
      notify, based on a difference between a measured value obtained by measuring a color of each test image in the colorimetric pattern output by the image output unit and a target value determined according to characteristics of the recording medium used for outputting the image, whether resetting is to be performed in relation to the image processing unit or be performed in relation to the image output unit.

2. The information processing device according to claim 1, wherein,
   when a difference between a measured density value of the test image with a single-color maximum density in the plurality of test images included in the colorimetric pattern and the target value is equal to or larger than a threshold, the processor notifies that the resetting is to be performed in relation to the image output unit.

3. The information processing device according to claim 2, wherein,
   even when the difference between the measured density value of the test image with the single-color maximum density in the plurality of test images included in the colorimetric pattern and the target value is smaller than the threshold, in a case where a color difference between a colorimetric value of the test image with multiple colors in which amount of colorant used per unit area is equal to or larger than a predetermined value and a target value of the test image is equal to or larger than a preset value, the processor notifies that the resetting is to be performed in the image output unit.

4. The information processing device according to claim 2, wherein,
   even when the difference between the measured density value of the test image with the single-color maximum density in the plurality of test images included in the colorimetric pattern and the target value is smaller than the threshold, in a case where a color difference between a colorimetric value of the test image with multiple colors in which amount of colorant used per unit area is equal to or larger than a predetermined value and a target value of the test image is smaller than a preset value, the processor notifies that the resetting is to be performed in the image processing unit.

5. The information processing device according to claim 1, wherein,
   when notifying that the resetting is to be performed in relation to the image output unit, the processor notifies that a machine output condition set in relation to the image output unit is to be adjusted.

6. The information processing device according to claim 2, wherein,
   when notifying that the resetting should be performed in relation to the image output unit, the processor notifies that a machine output condition set in relation to the image output unit is to be adjusted.

7. The information processing device according to claim 3, wherein,
   when notifying that the resetting should be performed in relation to the image output unit, the processor notifies that a machine output condition set in relation to the image output unit is to be adjusted.

8. The information processing device according to claim 4, wherein,
   when notifying that the resetting should be performed in relation to the image output unit, the processor notifies that a machine output condition set in relation to the image output unit is to be adjusted.

9. The information processing device according to claim 5, wherein
   the machine output condition includes at least one of a transfer voltage condition for transferring a colorant image formed on an intermediate transfer member onto the recording medium, and a fixing temperature condition for fixing the colorant image formed on the recording medium.

10. The information processing device according to claim 6, wherein
    the machine output condition includes at least one of a transfer voltage condition for transferring a colorant image formed on an intermediate transfer member onto the recording medium, and a fixing temperature condition for fixing the colorant image formed on the recording medium.

11. The information processing device according to claim 7, wherein
    the machine output condition includes at least one of a transfer voltage condition for transferring a colorant image formed on an intermediate transfer member onto the recording medium, and a fixing temperature condition for fixing the colorant image formed on the recording medium.

12. The information processing device according to claim 8, wherein
    the machine output condition includes at least one of a transfer voltage condition for transferring a colorant image formed on an intermediate transfer member onto the recording medium, and a fixing temperature condition for fixing the colorant image formed on the recording medium.

13. The information processing device according to claim 1, wherein,
when notifying that the resetting is to be performed in relation to the image processing unit, the processor notifies that a color conversion coefficient set in relation to the image processing unit is to be adjusted.

14. The information processing device according to claim 2, wherein,
when notifying that the resetting is to be performed in relation to the image processing unit, the processor notifies that a color conversion coefficient set in relation to the image processing unit is to be adjusted.

15. The information processing device according to claim 3, wherein,
when notifying that the resetting is to be performed in relation to the image processing unit, the processor notifies that a color conversion coefficient set in relation to the image processing unit is to be adjusted.

16. The information processing device according to claim 4, wherein,
when notifying that the resetting is to be performed in relation to the image processing unit, the processor notifies that a color conversion coefficient set in relation to the image processing unit is to be adjusted.

17. A non-transitory computer readable medium storing a program causing a computer to execute a process comprising:
instructing an image output unit to output a colorimetric pattern including a plurality of test images, the image output unit being configured to output, onto a recording medium, an image based on image data processed by an image processing unit, and
notifying, based on a difference between a measured value obtained by measuring a color of each test image in the colorimetric pattern output by the image output unit and a target value determined according to characteristics of the recording medium used for outputting the image, whether resetting is to be performed in relation to the image processing unit or be performed in relation to the image output unit.

* * * * *